UNITED STATES PATENT OFFICE.

AUGUST BREUER, OF ISERLOHN, GERMANY.

ELECTROLYTIC DIAPHRAGM.

SPECIFICATION forming part of Letters Patent No. 504,703, dated September 12, 1893.

Application filed January 4, 1892. Serial No. 417,339. (No specimens.)

*To all whom it may concern:*

Be it known that I, AUGUST BREUER, a subject of the King of Prussia, formerly residing at Duisburg, but now at Iserlohn, Germany, have invented certain new and useful Improvements in and Relating to Diaphragms Employed in Electrolytical Processes; and I do hereby declare the following to be a full, clear, and exact description of the invention, such as will enable others skilled in the art to which it appertains to make and use the same.

The invention has relation to diaphragms employed in electrolytical processes, in the construction of which various materials have heretofore been used, such as parchment, parchment paper, and analogous organic materials. When, however, a caustic reaction takes place in the electrolyte, these substances are not available, and it is necessary to employ a diaphragm constructed of a material capable of resisting such action. To this end the diaphragms heretofore and now used are made of clay or earthenware, and it is well known that their porosity is soon destroyed whenever caustic bodies or substances are formed in or separated from the electrolyte or when halogen elements are present; this is especially the case in the decomposition of solutions of the chlorides of the alkalies, so that the diaphragms become worthless in a comparatively short time.

The invention has for its object the provision of a diaphragm that is not only capable of resisting the action of caustic bodies, but that will retain its porosity for almost an indefinite period.

Attempts have been made to construct the partitions or diaphragms, cups or cells for electrolytical apparatus of a hydraulic cement, as Portland, for instance, and experiments have demonstrated that this substance has the property of resisting not only the action of alkaline solutions but also that of the halogen elements in a much higher degree than any substance heretofore used. In fact it has been demonstrated that cement is an almost perfect resistance to the deleterious action of the chemicals referred to. On the other hand, the said experiments have also fully demonstrated that diaphragms, cups or cells made of cement become inoperative in a much shorter time than any of the materials heretofore used owing to the density of the substance, its pores becoming readily and speedily choked up.

To these ends the invention consists in a porous diaphragm made of a cement, as will now be fully described.

In carrying out my invention I make the diaphragms either of natural or artificial cement or of lime or magnesia cement, that is to say a cement that will set or harden at normal temperatures when combined with a suitable liquid in due proportions and impart to them the proper degree of porosity in various ways. For instance, a porous substance capable of resisting the action of the electrolyte, or the reaction that ensues in the electrolysis of a lye, such as pumice stone, for instance, is mixed with the cement in suitable proportions, or a soluble substance is mixed therewith that will be dissolved out during the setting of the cement or that may be dissolved out after the setting or hardening, and so leave the diaphragm in the desired porous condition. The cement may be mixed, for instance, in a concentrated solution of a suitable salt, the cement absorbing the water of the solution, and after setting or hardening the salt is washed out or may be allowed to dissolve out in the electrolyte or in a more or less electrolyzed lye. On the other hand, substances that will be destroyed or decomposed by the electrolyte or lye, or in the electrolytical operation may be combined with the cement, leaving the diaphragm in a porous condition, as will be the case if organic substances are combined with the cement.

Practice has demonstrated that whatever cement is used in the construction of the diaphragms, the latter invariably resist the action of caustic bodies as well as the action of chlorine, and retain their porosity for an indefinite time.

By the means described a diaphragm for electrolytical purposes is obtained that not only possesses the advantages referred to, but the degree of porosity of which can be readily controlled, that can be obtained cheaply and of any desired form, as in the form of plates, cylinders, &c.

I do not desire to claim herein either the mode of making porous diaphragms, cups or cells for electrolytical apparatus by combining with a cement a substance capable of being removed after the cement has set or hardened, or a diaphragm, cup or cell consisting of a mixture of a cement and such a substance, these features forming the subject matter of a divisional application, filed September 14, 1892, Serial No. 445,882.

Having thus described my invention, what I claim as new therein, and desire to secure by Letters Patent, is—

A diaphragm cup or cell for electrolytical apparatus composed of a cement that will set or harden at normal temperatures when combined with a suitable liquid in due proportions, and of a porous substance capable of resisting the action of an electrolyte, as comminuted pumice stone combined with and distributed throughout the body of cement.

AUGUST BREUER.

Witnesses:
WM. ESSENWEIN,
RUDOLPH FRICKE.